(12) United States Patent
Gilliam et al.

(10) Patent No.: US 12,149,123 B2
(45) Date of Patent: Nov. 19, 2024

(54) ROTOR FOR RELUCTANCE MACHINE AND METHOD OF MANUFACTURING THE SAME

(71) Applicant: GM GLOBAL TECHNOLOGY OPERATIONS LLC, Detroit, MI (US)

(72) Inventors: Mary Gilliam, Farmington Hills, MI (US); Anthony Michael Coppola, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 207 days.

(21) Appl. No.: 18/084,216

(22) Filed: Dec. 19, 2022

(65) Prior Publication Data
US 2024/0204593 A1 Jun. 20, 2024

(51) Int. Cl.
| | |
|---|---|
| H02K 1/24 | (2006.01) |
| H02K 1/04 | (2006.01) |
| H02K 15/02 | (2006.01) |
| H02K 15/12 | (2006.01) |

(52) U.S. Cl.
CPC ............... *H02K 1/246* (2013.01); *H02K 1/04* (2013.01); *H02K 15/022* (2013.01); *H02K 15/12* (2013.01)

(58) Field of Classification Search
CPC ........ H02K 1/04; H02K 1/246; H02K 15/022; H02K 15/12; H02K 19/14; H02K 15/0012; H02K 1/265
See application file for complete search history.

(56) References Cited

U.S. PATENT DOCUMENTS

| | | | |
|---|---|---|---|
| 8,361,607 B2 * | 1/2013 | Higuchi | C08J 7/046 977/773 |
| 11,223,252 B2 | 1/2022 | Coppola et al. | |
| 2014/0170400 A1 | 6/2014 | Gilliam et al. | |
| 2021/0040608 A1 * | 2/2021 | Coppola | C23C 16/511 |

OTHER PUBLICATIONS

U.S. Appl. No. 17/537,563, filed Nov. 30, 2021, Coppola et al.

\* cited by examiner

*Primary Examiner* — Leda T Pham

(57) ABSTRACT

A rotor for a reluctance machine includes a rotor body having cavities defined by inner surfaces of the rotor body, a filler disposed within the cavities, and an adhesive coating that covalently bonds the filler to the inner surfaces of the rotor body. The adhesive coating exhibits a composite structure including a continuous matrix component and a discontinuous organic component dispersed throughout the matrix component, wherein the matrix component comprises an inorganic siloxane network and the organic component comprises a plurality of organic groups bonded to the inorganic siloxane network. The adhesive coating is formed on the inner surfaces of the rotor body by depositing a precursor composition on the inner surfaces of a rotor body and exposing the precursor composition to a plasma. The precursor composition comprises an organofunctional silane or a hydrolysate thereof.

20 Claims, 4 Drawing Sheets

ROTOR FOR RELUCTANCE MACHINE AND METHOD OF MANUFACTURING THE SAME

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to electric machines, and more particularly to rotors for reluctance machines that include a rotor body with cavities defining magnetic flux barriers.

Reluctance machines include an outer stationary stator and an inner rotor separated by an air gap. The rotor has a cylindrical body made of a soft magnetic material with multiple axially extending cavities configured to form radially spaced-apart magnetic flux barriers. The rotor cavities exhibit high resistance to magnetic flux flow or high magnetic reluctance, as compared to the soft magnetic material of the rotor body. The spaces between the flux barriers are configured to exhibit minimal magnetic reluctance and may be referred to as flux guides. In operation, magnetic flux is generated by passing an electric current through wire windings distributed around radially spaced-apart teeth of the stator. The magnetic flux flows through the stator and the rotor and interacts with the soft magnetic material of the rotor body. When the natural path of the magnetic flux generated by the stator is aligned with the path defined by the flux guides, magnetic reluctance is minimized. When the rotor is positioned such that the natural path of the magnetic flux generated by the stator would be through the magnetic flux barriers, the magnetic reluctance increases and the rotor will naturally rotate back toward a position of minimal magnetic reluctance, which generates torque.

The cavities defining the magnetic flux barriers in the rotor generally exhibit an arcuate shape with opposite ends adjacent an outer circumference of the rotor. To provide the rotor with structural stability, the cavities may be segmented by webs and the ends of the cavities may be spaced-apart from the outer circumference of the rotor by bridges. The webs and/or bridges may act as a magnetic short circuit by allowing magnetic flux to pass through the rotor along a different path than that defined by the flux guides, which reduces the efficiency of the electric machine. Additional or alternative structural support may be provided by filling the cavities with a paramagnetic or diamagnetic filler material. In such case, a strong bond should be formed between the filler material and the inner surfaces of the cavities.

SUMMARY

A method of manufacturing a rotor for a reluctance machine is disclosed. The method comprises depositing a precursor composition on inner surfaces of a rotor body and exposing the precursor composition to a plasma to form an adhesive coating on the inner surfaces of the rotor body that is covalently bonded to the inner surfaces of the rotor body. The inner surfaces of the rotor body define cavities extending in a longitudinal direction through the rotor body. The precursor composition comprises an organofunctional silane or a hydrolysate thereof. The organofunctional silane is represented by the formula: $R^1-(CH_2)_n-Si(R^2)_a(OR^3)_{3-a}$, where $R^1$ is an organofunctional group, $R^2$ and $R^3$ are individually a methyl group or an ethyl group, n is zero or an integer in a range of 1-12, and a is 0, 1, or 2. The adhesive coating exhibits a composite structure including a continuous matrix component and a discontinuous organic component dispersed throughout the matrix component. The matrix component comprises an inorganic siloxane network and the organic component comprises a plurality of organofunctional groups bonded to the inorganic siloxane network.

The organofunctional silane may comprise an amine functional silane, a diamine functional silane, an epoxy functional silane, a glycidyl functional silane, an acrylate functional silane, a vinyl functional silane, an isocyanate functional silane, or a combination thereof.

The method may further comprise generating the plasma in a plasma generation chamber by applying an electrical field to a neutral gas and directing a plume of the plasma from the plasma generation chamber into a process chamber downstream of the plasma generation chamber.

In some aspects, the precursor composition may be exposed to the plasma prior to depositing the precursor composition on the inner surfaces of the rotor body. In such case, the precursor composition may be exposed to the plasma by introducing aerosol particles or vapors of the precursor composition into the plume of the plasma in the process chamber and the precursor composition may be deposited on the inner surfaces of the rotor body in the process chamber downstream of the plasma generation chamber by directing the plume of the plasma at an end face of the rotor body and into the cavities defined by the inner surfaces of the rotor body.

In some aspects, the precursor composition may be exposed to the plasma after the precursor composition is deposited on the inner surfaces of the rotor body. In such case, the precursor composition may be exposed to the plasma by directing the plume of the plasma at an end face of the rotor body and into the cavities defined by the inner surfaces of the rotor body.

The precursor composition may be exposed to the plasma in an atmospheric pressure environment.

The precursor composition may be exposed to the plasma at a temperature of greater than or equal to about 30 degrees Celsius to less than or equal to about 100 degrees Celsius.

The plasma may comprise dry air, nitrogen, argon, helium, carbon dioxide, water vapor, or a combination thereof.

The method may further comprise, prior to exposing the precursor composition to the plasma, hydrolyzing the organofunctional silane by exposing the precursor composition to water.

The precursor composition may further comprise particles of an elastomer having a mean particle diameter of greater than or equal to about 1 micrometer to less than or equal to about 5 micrometers.

The method may further comprise introducing a filler into the cavities in the rotor body and curing the filler to covalently bond the filler to the adhesive coating. In such case, the filler may comprise at least one polymer selected from the group consisting of an epoxy resin, amine polymer, vinyl polymer, acrylic polymer, methacrylic polymer, polyurethane, silicone, and rubber.

A method of manufacturing a rotor for a reluctance machine is disclosed. The method comprises depositing a precursor composition on inner surfaces of a rotor body, exposing the precursor composition to a plasma via an atmospheric pressure plasma assisted technique to form an adhesive coating on the inner surfaces of the rotor body that is covalently bonded to the inner surfaces of the rotor body via a plurality of oxane bonds, introducing a filler into the cavities in the rotor body, and curing the filler to covalently bond the filler to the adhesive coating. The inner surfaces of the rotor body define cavities extending in a longitudinal direction through the rotor body. The precursor composition comprises an organofunctional silane or a hydrolysate thereof. The organofunctional silane is represented by the formula: $R^1$—$(CH_2)_n$—$Si(R^2)_a(OR^3)_{3-a}$, where $R^1$ is an organofunctional group, $R^2$ and $R^3$ are individually a methyl group or an ethyl group, n is zero or an integer in a range of 1-12, and a is 0, 1, or 2. The adhesive coating exhibits a composite structure including a continuous matrix component and a discontinuous organic component dispersed throughout the matrix component. The matrix component comprises an inorganic siloxane network and the organic component comprises a plurality of organofunctional groups bonded to the inorganic siloxane network. The filler comprises at least one polymer selected from the group consisting of an epoxy resin, amine polymer, vinyl polymer, acrylic polymer, methacrylic polymer, polyurethane, silicone, and rubber.

The method may further comprise generating the plasma in a plasma generation chamber by applying an electrical field to a neutral gas and directing a plume of the plasma from the plasma generation chamber into a process chamber downstream of the plasma generation chamber.

The precursor composition may be exposed to the plasma prior to depositing the precursor composition on the inner surfaces of the rotor body. In such case, the precursor composition may be exposed to the plasma by introducing aerosol particles or vapors of the precursor composition into the plume of the plasma in the process chamber and the precursor composition may be deposited on the inner surfaces of the rotor body in the process chamber downstream of the plasma generation chamber by directing the plume of the plasma at an end face of the rotor body and into the cavities defined by the inner surfaces of the rotor body.

The precursor composition may be exposed to the plasma after the precursor composition is deposited on the inner surfaces of the rotor body. In such case, the precursor composition on the inner surfaces of the rotor body may be exposed to the plasma by directing the plume of the plasma at an end face of the rotor body and into the cavities defined by the inner surfaces of the rotor body.

The electrical field may be applied to the neutral gas by a power source having a power output of greater than or equal to about 0.75 kilowatts to less than or equal to about 6 kilowatts. The power source may comprise a pulsed direct current power source operating at a pulse frequency of greater than or equal to about 15 kilohertz to less than or equal to about 25 kilohertz or an alternating current power source operating at a frequency of greater than or equal to about 20 kilohertz to less than or equal to about 5 gigahertz.

The electrical field may be applied to the neutral gas using a radiofrequency source operating at a frequency of greater than or equal to about 10 megahertz to less than or equal to about 20 megahertz or a microwave source operating at a frequency of greater than or equal to about 0.5 gigahertz to less than or equal to about 5 gigahertz.

A rotor for a reluctance machine is disclosed. The rotor comprises a rotor body extending in a longitudinal direction parallel to a rotational axis of the rotor. The rotor body comprises a stack of laminations made of an electrical steel, with each of the laminations including cut-outs. The laminations are stacked relative to one another such that the cut-outs in the laminations are aligned with one another and together define cavities extending through the rotor body in the longitudinal direction and defined by inner surfaces of the rotor body. The cavities are configured to form magnetic flux barriers. A filler is disposed within the cavities. The filler comprises at least one polymer selected from the group consisting of an epoxy resin, amine polymer, vinyl polymer, acrylic polymer, methacrylic polymer, polyurethane, silicone, and rubber. An adhesive coating is disposed along an interface between the inner surfaces of the rotor body and the filler. The adhesive coating exhibits a composite structure including a continuous matrix component and a discontinuous organic component dispersed throughout the matrix component. The matrix component comprises an inorganic siloxane network and the organic component comprises a plurality of organofunctional groups bonded to the inorganic siloxane network. The organic component constitutes, by mass, greater than or equal to about 20% of the adhesive coating. The adhesive coating is covalently bonded to the filler and is covalently bonded to the inner surfaces of the rotor body via a plurality of silicon-oxygen bonds. The adhesive coating has a thickness of greater than or equal to about 0.5 micrometers to less than or equal to about 3 micrometers.

The composite structure of the adhesive coating may further comprise a particulate component distributed throughout the matrix component. The particulate component may comprise particles of an elastomer.

The cavities may exhibit a continuous shape with opposite distal ends adjacent an outer circumference of the rotor body. The cavities may not be segmented by webs defined by the rotor body.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

A rotor for a reluctance machine according to the present disclosure comprises a rotor body with cavities extending therethrough that are configured to form magnetic flux barriers during operation of the reluctance machine. Prior to introducing a filler material into the cavities for structural stability, an adhesive coating is formed on inner surfaces of the rotor body defining the cavities. The adhesive coating forms strong covalent bonds with the inner surfaces of the rotor body defining the cavities and, when the filler material is introduced into the cavities, likewise forms strong covalent bonds with the filler material. The strong bonds formed by the adhesive coating at and along the interface between the cavity surfaces and the filler material allow the rotor to operate at relatively high speeds and torque, which increases the efficiency and power of the reluctance machine. In addition, the strong bonds formed by the adhesive coating between the cavity surfaces and the filler material may improve the dimensional stability of the cavities, which may eliminate the need for web-like structures within the cavities for reinforcement.

The adhesive coating may be formed on the inner surfaces of the cavities by depositing a precursor composition comprising an organosilicon molecule on the inner surfaces of the cavities. The organosilicon molecule includes a silicon atom bonded to at least one organofunctional group and to at least one oxygen-containing group. The organosilicon molecule may be an organofunctional silane or a hydrolysate thereof. The precursor composition may be deposited on the inner surfaces of the cavities using an atmospheric pressure plasma assisted technique, which may promote the formation of strong covalent silicon-oxygen bonds between the inner surfaces of the cavities and the organosilicon molecule, without destroying or removing the organofunctional group therefrom. As such, when the filler material is subsequently introduced into the cavities, the organofunctional groups bonded to the organosilicon molecules in the adhesive coating are available to react and/or interact with the filler material, for example, by forming strong chemical and/or molecular bonds, including covalent bonds, chain entanglement and interpenetrating networks, dipole-dipole interactions, and van der Waals forces. Molecules and/or particles of an oligomeric and/or polymeric material may be included in the adhesive coating to provide the adhesive coating with improved fatigue resistance and thermal stability, for example, by increasing the elasticity and thermal stability of the adhesive coating and by relieving stresses within the adhesive coating.

Figure 1:
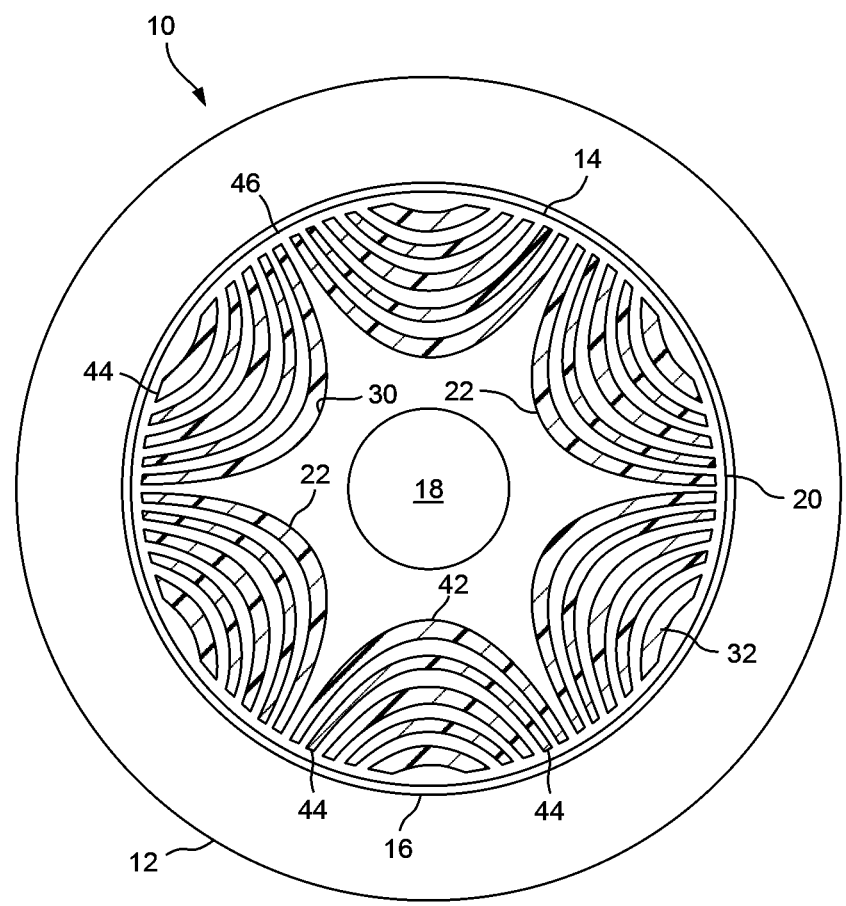
FIG. 1 is a schematic cross-sectional view of a rotor and a stator for a reluctance machine, the rotor including a rotor body with arcuate cavities extending therethrough and a filler material disposed within the arcuate cavities.

Referring now to FIG. 1, a reluctance machine 10 includes an outer stationary stator 12 and an inner rotor 14 separated by an air gap 16. The rotor 14 is mounted on a rotor shaft 18 and the stator 12 is concentrically disposed around the rotor 14 and the rotor shaft 18. The rotor 14 has a rotor body 20 with cavities 22 formed therein. The rotor body 20 has a generally cylindrical shape and extends in a longitudinal direction parallel to a rotational axis 24 (FIG. 5) of the rotor 14. The rotor body 20 may be made of a soft magnetic material, i.e., a material that can be easily magnetized and demagnetized. For example, the rotor body 20 may comprise iron, ferrite, or an iron alloy. The term "iron alloy," as used herein, refers to a material that comprises, by mass, greater than or equal to about 78% or greater than or equal to about 80% iron (Fe) and one or more other elements (referred to as "alloying" elements) selected to impart certain desirable properties to the material that are not exhibited by pure iron. In some embodiments, the rotor body 20 may comprise an electrical steel, which may be an iron alloy comprising, by weight, greater than 0% to less than or equal to 6.5% silicon, less than or equal to 0.5% manganese, less than or equal to 0.5% aluminum, and iron as balance. In some embodiments, the rotor body 20 may comprise an iron alloy comprising, by weight, greater than or equal to 2% to less than or equal to 3.5% silicon.

Figure 2:
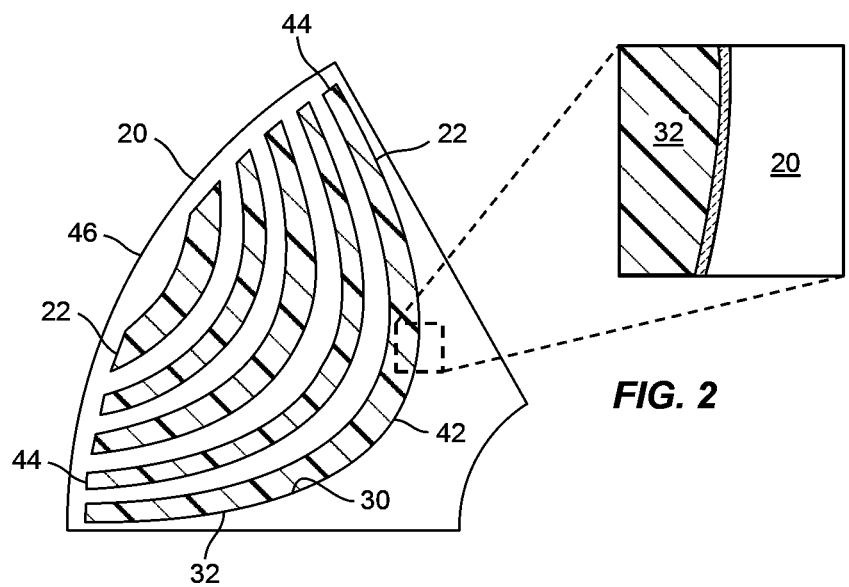
FIG. 2 is an enlarged view of a portion of the rotor of FIG. 1 depicting an adhesive coating disposed along an interface between a surface of the rotor body and the filler material that bonds the filler material to the surface of the rotor body.

The cavities 22 defined within the rotor body 20 are configured to form magnetic flux barriers during operation of the reluctance machine 10. The cavities 22 extend through the rotor body 20 in the longitudinal direction, from a first end face 26 to an opposite second end face 28 (FIG. 5) of the rotor body 20. Each of the cavities 22 may exhibit a continuous shape having a vertex 42 proximal to the rotor shaft 18 (and the rotational axis 24 of the rotor 14) and opposite distal ends 44 adjacent an outer circumference 46 of the rotor body 20. In some embodiments, as shown in FIGS. 1 and 2, each of the cavities 22 may exhibit a continuous arcuate shape. The cavities 22 are defined by inner surfaces 30 of the rotor body 20. The cavities 22 may have widths of greater than or equal to about 2 millimeters to less than or equal to about 10 millimeters, or about 5 millimeters. The cavities 22 may extend entirely through the rotor body 20 and thus may have lengths of greater than or equal to about 10 millimeters, about 25 millimeters, or about 40 millimeters and less than or equal to about 150 millimeters, about 100 millimeters, or about 50 millimeters.

The cavities 22 are filled with a filler 32. The filler 32 comprises a nonmagnetic material, i.e., a paramagnetic or diamagnetic material. For example, the filler material 32 may comprise a polymer, e.g., an epoxy resin, amine polymer, vinyl polymer, acrylic polymer, methacrylic polymer, polyurethane, silicone, rubber, or a combination thereof.

As shown in FIG. 2, an adhesive coating 34 is disposed along an interface between the inner surfaces 30 of the rotor body 20 and the filler 32. The adhesive coating 34 is solid and may be chemically bonded (e.g., covalently bonded) to the inner surfaces 30 of the rotor body 20 and to the filler 32. The strong chemical bond formed between the inner surfaces 30 of the rotor body 20 and the filler 32 by the adhesive coating 34 may improve the mechanical stability of the rotor 14 and thereby allow the rotor 14 to operate at relatively high speeds and torque, which may increase the efficiency and power of the reluctance machine 10. In addition, the strong chemical bond formed between the inner surfaces 30 of the rotor body 20 and the filler 32 by the adhesive coating 34 may improve the dimensional stability of the cavities 22, which may eliminate the need for web-like structures within the cavities 22 for mechanical reinforcement. As such, each of the cavities 22 in the rotor body 20 may extend continuously from one distal end 44 to another and may not be segmented by webs or linking structures defined by the rotor body 20.

Figure 3:
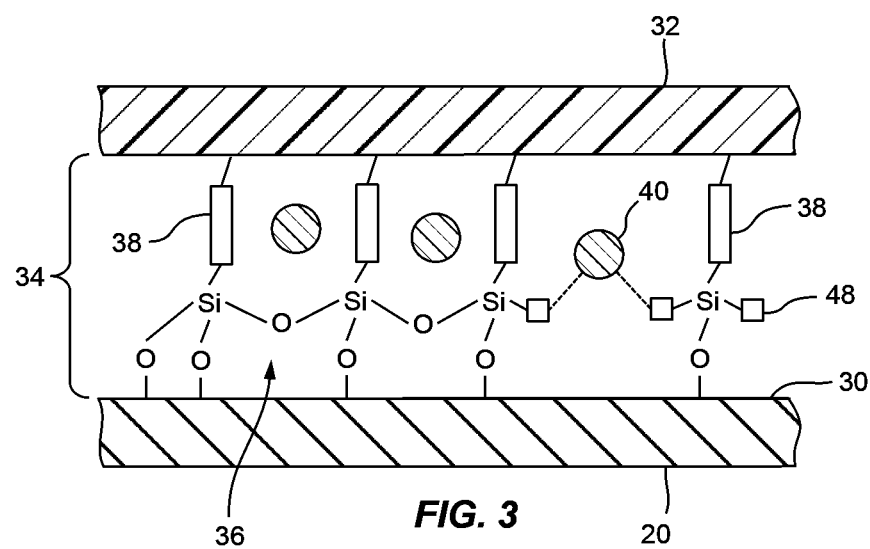
FIG. 3 is a schematic depiction of the adhesive coating of FIG. 2, the adhesive coating including organofunctional silanes covalently bonded to the surface of the rotor body and to the filler material.

As shown in FIG. 3, the adhesive coating 34 exhibits a composite structure including a continuous matrix component 36, a discontinuous organic component 38, and optionally a discontinuous particulate component 40. The adhesive coating 34 may have a thickness of greater than or equal to about 0.5 micrometers to less than or equal to about 3 micrometers, or less than or equal to about 5 micrometers.

The matrix component 36 covalently bonds the adhesive coating 34 to the inner surfaces 30 of the rotor body 20 and may form cohesive bonds within the adhesive coating 34 itself that provide the adhesive coating 34 with structural integrity. The matrix component 36 comprises an inorganic siloxane network that is bonded to the inner surfaces 30 of the rotor body 20 via a plurality of covalent oxane bonds (M—O—Si, where M is a metal atom, e.g., Fe, in the rotor body 20). The silicon atoms in the matrix component 36 may be bonded to one another via a plurality of covalent siloxane (Si—O—Si) bonds. The silicon atoms in the matrix component 36 each may be bonded to one, two, three, or four oxygen atoms. Silicon atoms having a single Si—O bond may be referred to as mono-functional units (M-units), silicon atoms bonded to two oxygen atoms may be referred to as difunctional units (D-units), and silicon atoms bound to three and four oxygen atoms may be respectively referred to as trifunctional units (T-units) and tetrafunctional units (Q-units). In some embodiments, the matrix component 36 may include greater than or equal to 0% and less than or equal to about 5% M-units, greater than or equal to 0% and less than or equal to about 50% D-units, greater than or equal to about 40% and less than or equal to about 90% T-units, and greater than or equal to 0% and less than or equal to about 10% Q-units. For example, in some embodiments, the matrix component 36 may include greater than or equal to about 10% and less than or equal to about 25% D-units and greater than or equal to about 70% and less than or equal to about 90% T-units.

The organic component 38 covalently bonds the adhesive coating 34 to the filler 32. The organic component 38 is dispersed throughout the matrix component 36 and comprises a plurality of organic groups or domains bonded to the inorganic siloxane network. In some embodiments, the organic groups of the organic component 38 may help establish cohesion within the adhesive coating 34, for example, by forming non-covalent electrostatic interactions with other organic groups and/or hydroxyl (—OH) groups 48 in the adhesive coating 34. The organic component 38 may comprise, for example, chains of carbon atoms bonded to one another (C—C bonds) and to one or more organic groups (e.g., amino groups) in the adhesive coating 34. The organic component 38 may constitute, by mass, greater than or equal to about 10%, greater than or equal to about 20%, or greater than or equal to about 25% and less than or equal to about 40% of the adhesive coating 34.

The particulate component 40 may provide the adhesive coating 34 with improved fatigue resistance and thermal stability, for example, by increasing the elasticity of the adhesive coating 34 and by relieving stresses within the adhesive coating 34. The particulate component 40 may be distributed throughout the matrix component 36 and may comprise particles of an elastomer, e.g., silicone. For example, the particulate component 40 may comprise particles of cross-linked polydimethylsiloxane (PDMS). The particulate component 40 may be non-covalently bonded to the organic groups and/or hydroxyl (—OH) groups 48 in the adhesive coating 34. The particles of the particulate component 40 may include functional groups bonded to the surface thereof and such functional groups may be formulated to react and bond with and/or interact with the organic groups of the organic component 38 of the adhesive coating 34. The particulate component 40 may comprise particles having a mean particle diameter of greater than or equal to about 1 micrometer to less than or equal to about 5 micrometers. The particulate component 40 may constitute, by mass, greater than or equal to about 5% and less than or equal to about 20% of the adhesive coating 34.

The adhesive coating 34 depicted FIG. 3 in includes a monolayer of organosilicon molecules bonded to the inner surface 30 of the rotor body 20 and to the filler 32; however, other arrangements are possible. For example, in some embodiments, the adhesive coating 34 may comprise multiple layers of organosilicon molecules. Additionally or alternatively, the matrix component 36 of the adhesive coating 34 may exhibit a monolithic three-dimensional interconnected siloxane network extending between the inner surfaces 30 of the rotor body 20 and the filler 32.

Figure 4:
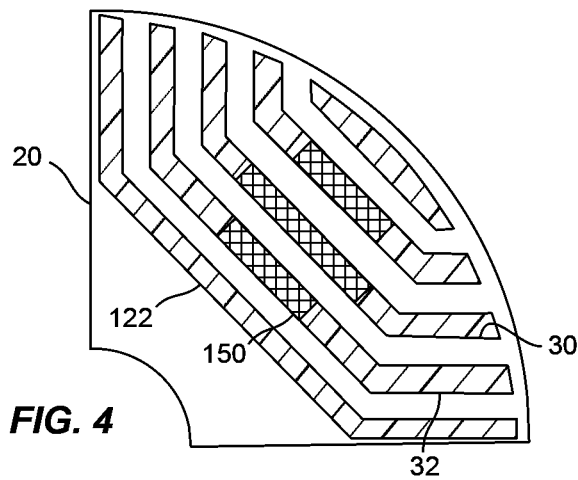
FIG. 4 is a schematic cross-sectional view of a portion of a rotor for a reluctance machine, the rotor including a rotor body with cavities extending therethrough, permanent magnets disposed within some of the cavities, and a filler material disposed within the cavities and bonded to inner surfaces of the rotor body and to outer surfaces of the permanent magnets.

Referring now to FIG. 4, in some embodiments, the rotor 14 may include cavities 122 defined by the inner surfaces 30 of the rotor body 20 and one or more permanent magnets 150 disposed within one or more of the cavities 122. In such case, the adhesive coating 34 may be disposed along an interface between the inner surfaces 30 of the rotor body 20 and the filler 32 and optionally along an interface between outer surfaces 152 of the permanent magnets 150 and the filler 32. In some embodiments, the permanent magnets 150 may be introduced into the cavities 122 after the adhesive coating 34 is formed on the inner surfaces 30 of the rotor body 20.

Figure 5:
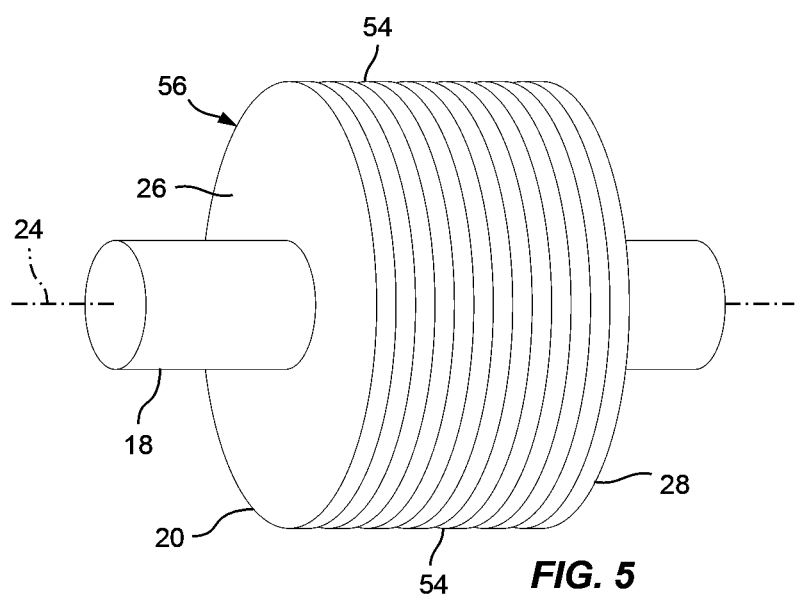
FIG. 5 is a schematic perspective view of a rotor for a reluctance machine, the rotor being defined by a stack of disc-shaped laminations mounted on a rotor shaft.
Figure 6:
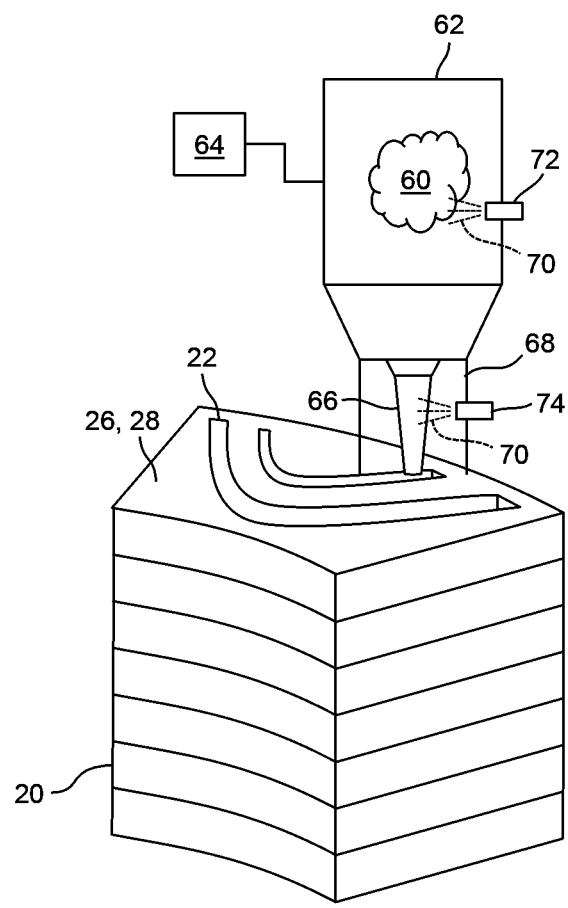
FIG. 6 is a schematic perspective view of a portion of a rotor for a reluctance machine during deposition of an adhesive coating on inner surfaces thereof using an atmospheric pressure plasma technique.

Referring now to FIGS. 5 and 6, the rotor 14 may be manufactured by a method that includes one or more of the following steps. In a first step, a plurality of disc- or annular-shaped laminations 54 may be assembled in the form of a stack 56 and bonded to one another to form the rotor body 20. Each of the laminations 54 may include cut-outs (not shown) and the laminations 54 may be stacked relative to one another such that the cut-outs therein are aligned with one another and together define the cavities 22 extending through the rotor body 20. Each of the laminations 54 may have a thickness defined in the longitudinal direction of less than or equal to about 2 millimeters.

In a second step, the inner surfaces 30 of the rotor body 20 defining the cavities 22 may be subjected to a plasma treatment to remove contaminants therefrom and form hydroxyl radicals (*OH) on the inner surfaces 30 of the rotor body 20. The plasma gas used to treat the inner surfaces 30 of the rotor body 20 may comprise dry air, nitrogen, argon, helium, carbon dioxide, water vapor, or a combination thereof.

In a third step, a precursor composition 70 may be deposited on the inner surfaces 30 of the rotor body 20. The precursor composition 70 may comprise an organosilicon molecule comprising a silicon atom bonded to at least one organofunctional group and to at least one oxygen-containing group (e.g., an alkoxy group). The organofunctional group bonded to the silicon atom is formulated to react and/or interact with and form covalent and/or noncovalent bonds with the filler 32, and the oxygen-containing group is formulated to react with and form covalent silicon-oxygen bonds with the inner surfaces 30 of the rotor body 20. For example, the precursor composition 70 may comprise an organofunctional silane or a hydrolysate thereof that is formulated to react with and form covalent bonds with the inner surfaces 30 of the rotor body 20 and to react and/or interact with and form covalent and/or noncovalent bonds with the filler 32. The organofunctional silane may be represented by the formula (1):

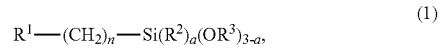

$$R^1-(CH_2)_n-Si(R^2)_a(OR^3)_{3-a}, \quad (1)$$

where $R^1$ is an organofunctional group, $R^2$ and $R^3$ are individually a methyl group (—$CH_3$) or an ethyl group (—$CH_2C_{H3}$), n is zero or an integer in a range of 1-12, and a is 0, 1, or 2. The number, n, of methylene bridges (—CH$_2$—) between the organofunctional group R$^1$ and the silicon (Si) atom may be selected to establish good bonding between the adhesive coating 34 and the filler 32. In some embodiments, the number of methylene bridges n may be greater than or equal to 3, 4, 5, 6, 7, or 8. The one or more —OR$^3$ groups are hydrolyzable groups and are capable of reacting with hydroxyl groups (—OH) and/or hydroxyl radicals (*OH) on the inner surfaces 30 of the rotor body 20 to form strong covalent silicon-oxygen (Si—O) bonds that anchor the organofunctional silane (and the adhesive coating 34) to the inner surfaces 30 of the rotor body 20. In embodiments where the precursor composition 70 comprises a hydrolysate of the organofunctional silane of formula (1), R$^3$ is a hydrogen (H) atom.

The organofunctional group R$^1$ is a nonhydrolyzable group and is selected to be reactive with the filler 32 to form strong covalent bonds therewith. In addition, the organofunctional group R$^1$ may bond with other organofunctional silanes and/or organic groups in the adhesive coating 34 via non-covalent electrostatic interactions. The organofunctional group R$^1$ may be an amino, diamino, epoxy, glycidyl, acrylate, vinyl, or isocyanate group. In embodiments where the organofunctional group R$^1$ is an amino group, the organofunctional silane may be referred to as an amine functional silane. Examples of amine functional silanes include 3-aminopropyl trimethoxysilane (CAS No. 13822-56-5) and 3-aminopropyl triethoxysilane (CAS No. 919-30-2). In embodiments where the organofunctional group R$^1$ is a diamino group, the organofunctional silane may be referred to as a diamine functional silane. Examples of diamine functional silanes include N-(2-aminoethyl)-3-aminopropyl trimethoxysilane (CAS No. 1760-24-3) and 1-[3-(Trimethoxysilyl)propyl]urea (CAS No. 23843-64-3). In embodiments where the organofunctional group R$^1$ is an epoxy group, the organofunctional silane may be referred to as an epoxy functional silane. Examples of epoxy functional silanes include 2-(3,4-epoxycyclohexyl)ethyltrimethoxysilane (CAS No. 3388-04-3). In embodiments where the organofunctional group R$^1$ is a glycidyl group, the organofunctional silane may be referred to as a glycidyl functional silane. Examples of glycidyl functional silanes include (3-glycidoxypropyl)trimethoxysilane (CAS No. 2530-83-8), (3-glycidoxypropyl)methyldiethoxysilane (CAS No. 2897-60-1), (3-glycidoxypropyl)dimethylethoxysilane (CAS No. 17963-04-1), and 8-glycidoxyoctyl trimethoxysilane (CAS. No. 1239602-38-0).

In some embodiments, the precursor composition 70 may comprise a nonfunctional silane and/or an organofunctional dipodal silane or a hydrolysate thereof. The organofunctional dipodal silane may be formulated to react with and form covalent bonds with the inner surfaces 30 of the rotor body 20 and with the filler 32. The organofunctional dipodal silane may have the formula (2):

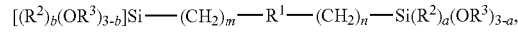

(2)

where R$^1$ is an organofunctional group, R$^2$ and R$^3$ are individually a methyl group (—CH$_3$) or an ethyl group (—CH$_2$CH$_3$), n and m are individually zero or an integer in a range of 1-12, and a and b are individually 0, 1, or 2. Like the organofunctional silane of formula (1), the organofunctional group R$^1$ may be an amino, diamino, epoxy, or glycidyl, acrylate, vinyl, or isocyanate group. Examples of organofunctional dipodal silanes include N,N'-bis[(3-trimethoxysilyl)propyl]ethylenediamine (CAS No. 68845-16-9).

The precursor composition 70 optionally may comprise a carrier gas. The carrier gas may comprise at least one of dry air, helium, argon, and nitrogen.

The precursor composition 70 optionally may comprise molecules and/or particles of an elastomer, e.g., silicone and/or rubber. For example, the precursor composition 70 may comprise particles of cross-linked polydimethylsiloxane (PDMS). The elastomer particles may include functional groups bonded to the surface thereof and such functional groups may be formulated to react and bond with and/or interact with the organofunctional group R$^1$ of the organofunctional silane. The elastomer particles may be introduced into the precursor composition 70 in the form of an aerosol or spray. The elastomer particles may have a mean particle diameter of greater than or equal to about 1 micrometer to less than or equal to about 5 micrometers.

In a fourth step, an atmospheric pressure plasma assisted technique may be used to expose the precursor composition 70 to a plasma 60 and form the adhesive coating 34 on the inner surfaces 30 of the rotor body 20. Referring now to FIG. 6, in an atmospheric pressure plasma technique, plasma 60 may be generated in a plasma generation chamber 62. A neutral gas may be supplied to the plasma generation chamber 62 and an electrical field may be applied to the neutral gas to generate the plasma 60 within the plasma generation chamber 60. The neutral gas may comprise dry air, nitrogen, argon, helium, carbon dioxide, or a combination thereof. An electric field may be applied to the neutral gas by a power source 64. The power source 64 may comprise a pulsed direct current (DC) operating at a pulse frequency of greater than or equal to about 15 kilohertz (kHz) to less than or equal to about 25 kilohertz or an alternating current (AC) operating at a frequency of greater than or equal to about 20 kilohertz to less than or equal to about 5 gigahertz (GHz). The power source 64 may have a power output of greater than or equal to about 0.75 kilowatts (KW) to less than or equal to about 6 kilowatts, or of about 1 kilowatt. The plasma 60 may be generated using a radiofrequency (RF) source or a microwave (MW)-driven plasma technique. To generate the plasma 60, the RF source may operate at a frequency of greater than or equal to about 10 megahertz (MHZ) to less than or equal to about 20 megahertz, or at about 13.56 megahertz. To generate the plasma 60 using a microwave (MW)-driven plasma technique, the MW source may operate at a frequency of greater than or equal to about 0.5 gigahertz to less than or equal to about 5 gigahertz, or at about 2.45 gigahertz. A jet or plume 66 of the plasma 60 may be directed from the plasma generation chamber 62 into a process chamber 68 downstream of the plasma generation chamber 62.

The precursor composition 70 may be exposed to the plasma 60 before or after the precursor composition 70 is deposited on the inner surfaces 30 of the rotor body 20. The precursor composition 70 may be exposed to the plasma 60 in an atmospheric pressure environment (i.e., at about 1 Atm) and at a temperature of greater than or equal to about 30 degrees Celsius (° C.) to less than or equal to about 100° C. or about 80° C. Exposing the precursor composition 70 to the plasma 60 and depositing the precursor composition 70 on the inner surfaces 30 of the rotor body 20 at temperatures in this range may help preserve the organic functionality of the organofunctional silane, prevent powder formation during the deposition of the precursor composition 70 on the inner surfaces 30 of the rotor body 20, and may allow for the formation of Si—O covalent bonds between the organofunctional silane and the inner surfaces 30 of the rotor body 20, without need for a catalyst or subsequent heating of the rotor body 20, for example, in a downstream oven. In addition, because the organofunctional silane can effectively react with the inner surfaces 30 of the rotor body 20 at relatively low temperatures, formation of the adhesive coating 34 can be effectively accomplished at greater depths within the cavities 22. For example, the presently disclosed atmospheric pressure plasma technique may allow for formation of the adhesive coating 34 on the inner surfaces 30 of the rotor body 20 at depths of up to about 50 millimeters.

In embodiments where the precursor composition 70 is exposed to the plasma 60 before the precursor composition 70 is deposited on the inner surfaces 30 of the rotor body 20, vapors or aerosol particles of the precursor composition 70 may be injected into the plasma 60. For example, vapors or aerosol particles of the precursor composition 70 may be injected into the plasma 60 via a first inlet port 72 in the plasma generation chamber 60, or vapors or aerosol particles of the precursor composition 70 may be injected into the plasma plume 66 via a second inlet port 74 in the process chamber 68. It may be desirable to inject the precursor composition 70 into the plasma plume 66 in the process chamber 68, instead of into the plasma 60 in the plasma generation chamber 60, as doing so may help preserve the organofunctional groups in the precursor composition 70, which may result in a relatively high concentration of organofunctional groups in the adhesive coating 34, ultimately resulting in more robust adhesion between the adhesive coating 34 and the filler 32. On the other hand, injecting the precursor composition 70 into the plasma 60 in the plasma generation chamber 60 may cause the organofunctional silane and/or hydrolysate molecules thereof to undergo certain undesirable chemical reactions, which may lead to the formation of unreactive solid silica particles and/or may destroy a majority of the organofunctional groups in the precursor composition 70, which may ultimately undermine adhesion between the adhesive coating 34 and the filler 32.

Thereafter, in the process chamber 68, the plasma plume 66 may be directed at the first end face 26 or the second end face 28 of the rotor body 20 and into the cavities 22 defined in the rotor body 20 such that the precursor composition 70 is deposited on the inner surfaces 30 of the rotor body 20 defining the cavities 22. During the atmospheric pressure plasma-assisted deposition process, the organofunctional silane in the precursor composition 70 will react with the hydroxyl groups (—OH) and/or the hydroxyl radicals (*OH) on the inner surfaces 30 of the rotor body 20 to form the adhesive coating 34. During formation of the adhesive coating 34, strong covalent silicon-oxygen (Si—O) bonds will form between the organofunctional silane and the inner surfaces 30 of the rotor body 20 that anchor the adhesive coating 34 thereto.

In embodiments where the precursor composition 70 is exposed to the plasma 60 after the precursor composition 70 is deposited on the inner surfaces 30 of the rotor body 20, the precursor composition 70 may be deposited on the inner surfaces 30 of the rotor body 20 by any suitable method, for example, by spraying. Thereafter, the plasma plume 66 may be directed at the first end face 26 or the second end face 28 of the rotor body 20 and into the cavities 22 and in contact with the precursor composition 70 on the inner surfaces 30 of the rotor body 20. When the precursor composition 70 is exposed to the plasma plume 66, the organofunctional silane in the precursor composition 70 will react with the inner surfaces 30 of the rotor body 20 to form the adhesive coating 34.

After formation of the adhesive coating 34, in a fifth step, the filler 32 may be introduced into the cavities 22 by any suitable method, for example, by injection. Bonds form between the organofunctional groups of the adhesive coating 34 and the filler 32 during curing of the filler 32. For example, during curing of the filler 32, the organofunctional groups in the adhesive coating 34 may react and/or interact with the filler 32, for example, by forming strong chemical and/or molecular bonds, including covalent bonds, chain entanglement and interpenetrating networks, dipole-dipole interactions, and van der Waals forces.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

The terminology used herein is for the purpose of describing example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended terms "comprises," "comprising," "including," and "having," are to be understood as non-restrictive terms used to describe and claim various embodiments set forth herein, in certain aspects, the terms may alternatively be understood to instead be a more limiting and restrictive term, such as "consisting of" or "consisting essentially of." Thus, for any given embodiment reciting compositions, materials, components, elements, ingredients, features, integers, operations, and/or process steps, the present disclosure also specifically includes embodiments consisting of, or consisting essentially of, such recited compositions, materials, components, elements, ingredients, features, integers, operations, and/or process steps. In the case of "consisting of," the alternative embodiment excludes any additional compositions, materials, components, elements, ingredients, features, integers, operations, and/or process steps, while in the case of "consisting essentially of," any additional compositions, materials, components, elements, ingredients, features, integers, operations, and/or process steps that materially affect the basic and novel characteristics are excluded from such an embodiment, but any compositions, materials, components, elements, ingredients, features, integers, operations, and/or process steps that do not materially affect the basic and novel characteristics can be included in the embodiment.

Any method steps, processes, and operations described herein are not to be construed as necessarily requiring their performance in the order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer, or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s), as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges and encompass minor deviations from the given values and embodiments, having about the value mentioned as well as those having exactly the value mentioned. Other than the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%. In addition, disclosure of ranges includes disclosure of all values and further divided ranges within the entire range, including endpoints and sub-ranges given for the ranges.

As used herein, the terms "composition" and "material" are used interchangeably to refer broadly to a substance containing at least the preferred chemical constituents, elements, or compounds, but which may also comprise additional elements, compounds, or substances, including trace amounts of impurities, unless otherwise indicated. An "X-based" composition or material broadly refers to compositions or materials in which "X" is the single largest constituent of the composition or material on a weight percentage (%) basis. This may include compositions or materials having, by weight, greater than 50% X, as well as those having, by weight, less than 50% X, so long as X is the single largest constituent of the composition or material based upon its overall weight. As used herein, the term "metal" may refer to a pure elemental metal or to an alloy of an elemental metal and one or more other metal or nonmetal elements.

What is claimed is:

1. A method of manufacturing a rotor for a reluctance machine, the method comprising:
    depositing a precursor composition on inner surfaces of a rotor body, the inner surfaces of the rotor body defining cavities extending in a longitudinal direction through the rotor body, the precursor composition comprising an organofunctional silane or a hydrolysate thereof, the organofunctional silane is represented by the formula: $R^1$—$(CH_2)_n$—$Si(R^2)_a(OR^3)_{3-a}$, where $R^1$ is an organofunctional group, $R^2$ and $R^3$ are individually a methyl group or an ethyl group, n is zero or an integer in a range of 1-12, and a is 0, 1, or 2; and
    exposing the precursor composition to a plasma to form an adhesive coating on the inner surfaces of the rotor body that is covalently bonded to the inner surfaces of the rotor body, the adhesive coating exhibiting a composite structure including a continuous matrix component and a discontinuous organic component dispersed throughout the matrix component, the matrix component comprising an inorganic siloxane network and the organic component comprising a plurality of organofunctional groups bonded to the inorganic siloxane network.

2. The method of claim 1, wherein the organofunctional silane comprises an amine functional silane, a diamine functional silane, an epoxy functional silane, a glycidyl functional silane, an acrylate functional silane, a vinyl functional silane, an isocyanate functional silane, or a combination thereof.

3. The method of claim 1, further comprising:
    generating the plasma in a plasma generation chamber by applying an electrical field to a neutral gas; and
    directing a plume of the plasma from the plasma generation chamber into a process chamber downstream of the plasma generation chamber.

4. The method of claim 3, wherein the precursor composition is exposed to the plasma prior to depositing the precursor composition on the inner surfaces of the rotor body, wherein the precursor composition is exposed to the plasma by introducing aerosol particles or vapors of the precursor composition into the plume of the plasma in the process chamber, and wherein the precursor composition is deposited on the inner surfaces of the rotor body in the process chamber downstream of the plasma generation chamber by directing the plume of the plasma at an end face of the rotor body and into the cavities defined by the inner surfaces of the rotor body.

5. The method of claim 3, wherein the precursor composition is exposed to the plasma after the precursor composition is deposited on the inner surfaces of the rotor body, and wherein the precursor composition is exposed to the plasma by directing the plume of the plasma at an end face of the rotor body and into the cavities defined by the inner surfaces of the rotor body.

6. The method of claim 1, wherein the precursor composition is exposed to the plasma in an atmospheric pressure environment.

7. The method of claim 1, wherein the precursor composition is exposed to the plasma at a temperature of greater than or equal to about 30 degrees Celsius to less than or equal to about 100 degrees Celsius.

8. The method of claim 1, wherein the plasma comprises dry air, nitrogen, argon, helium, carbon dioxide, water vapor, or a combination thereof.

9. The method of claim 1, further comprising:
prior to exposing the precursor composition to the plasma, hydrolyzing the organofunctional silane by exposing the precursor composition to water.

10. The method of claim 1, wherein the precursor composition further comprises particles of an elastomer having a mean particle diameter of greater than or equal to about 1 micrometer to less than or equal to about 5 micrometers.

11. The method of claim 1, further comprising:
introducing a filler into the cavities in the rotor body; and
curing the filler to covalently bond the filler to the adhesive coating,
wherein the filler comprises at least one polymer selected from the group consisting of an epoxy resin, amine polymer, vinyl polymer, acrylic polymer, methacrylic polymer, polyurethane, silicone, and rubber.

12. A method of manufacturing a rotor for a reluctance machine, the method comprising:
depositing a precursor composition on inner surfaces of a rotor body, the inner surfaces of the rotor body defining cavities extending in a longitudinal direction through the rotor body, the precursor composition comprising an organofunctional silane or a hydrolysate thereof, the organofunctional silane is represented by the formula: $R^1-(CH_2)_n-Si(R^2)_a(OR^3)_{3-a}$, where $R^1$ is an organofunctional group, $R^2$ and $R^3$ are individually a methyl group or an ethyl group, n is zero or an integer in a range of 1-12, and a is 0, 1, or 2;
exposing the precursor composition to a plasma via an atmospheric pressure plasma assisted technique to form an adhesive coating on the inner surfaces of the rotor body that is covalently bonded to the inner surfaces of the rotor body via a plurality of oxane bonds, the adhesive coating exhibiting a composite structure including a continuous matrix component and a discontinuous organic component dispersed throughout the matrix component, the matrix component comprising an inorganic siloxane network and the organic component comprising a plurality of organofunctional groups bonded to the inorganic siloxane network;
introducing a filler into the cavities in the rotor body, the filler comprising at least one polymer selected from the group consisting of an epoxy resin, amine polymer, vinyl polymer, acrylic polymer, methacrylic polymer, polyurethane, silicone, and rubber; and
curing the filler to covalently bond the filler to the adhesive coating.

13. The method of claim 12, further comprising:
generating the plasma in a plasma generation chamber by applying an electrical field to a neutral gas; and
directing a plume of the plasma from the plasma generation chamber into a process chamber downstream of the plasma generation chamber.

14. The method of claim 13, wherein the precursor composition is exposed to the plasma prior to depositing the precursor composition on the inner surfaces of the rotor body, wherein the precursor composition is exposed to the plasma by introducing aerosol particles or vapors of the precursor composition into the plume of the plasma in the process chamber, and wherein the precursor composition is deposited on the inner surfaces of the rotor body in the process chamber downstream of the plasma generation chamber by directing the plume of the plasma at an end face of the rotor body and into the cavities defined by the inner surfaces of the rotor body.

15. The method of claim 13, wherein the precursor composition is exposed to the plasma after the precursor composition is deposited on the inner surfaces of the rotor body, and wherein the precursor composition on the inner surfaces of the rotor body is exposed to the plasma by directing the plume of the plasma at an end face of the rotor body and into the cavities defined by the inner surfaces of the rotor body.

16. The method of claim 13, wherein the electrical field is applied to the neutral gas by a power source having a power output of greater than or equal to about 0.75 kilowatts to less than or equal to about 6 kilowatts, and wherein the power source comprises a pulsed direct current power source operating at a pulse frequency of greater than or equal to about 15 kilohertz to less than or equal to about 25 kilohertz or an alternating current power source operating at a frequency of greater than or equal to about 20 kilohertz to less than or equal to about 5 gigahertz.

17. The method of claim 13, wherein the electrical field is applied to the neutral gas using a radiofrequency source operating at a frequency of greater than or equal to about 10 megahertz to less than or equal to about 20 megahertz or a microwave source operating at a frequency of greater than or equal to about 0.5 gigahertz to less than or equal to about 5 gigahertz.

18. A rotor for a reluctance machine, the rotor comprising:
a rotor body extending in a longitudinal direction parallel to a rotational axis of the rotor, the rotor body comprising a stack of laminations made of an electrical steel, with each of the laminations including cut-outs, wherein the laminations are stacked relative to one another such that the cut-outs in the laminations are aligned with one another and together define cavities extending through the rotor body in the longitudinal direction and defined by inner surfaces of the rotor body, and wherein the cavities are configured to form magnetic flux barriers;
a filler disposed within the cavities, the filler comprising at least one polymer selected from the group consisting of an epoxy resin, amine polymer, vinyl polymer, acrylic polymer, methacrylic polymer, polyurethane, silicone, and rubber; and
an adhesive coating disposed along an interface between the inner surfaces of the rotor body and the filler, the adhesive coating exhibiting a composite structure including a continuous matrix component and a discontinuous organic component dispersed throughout the matrix component, the matrix component comprising an inorganic siloxane network and the organic component comprising a plurality of organofunctional groups bonded to the inorganic siloxane network, with the organic component constituting, by mass, greater than or equal to about 20% of the adhesive coating, wherein the adhesive coating is covalently bonded to the filler and is covalently bonded to the inner surfaces of the rotor body via a plurality of silicon-oxygen bonds, and wherein the adhesive coating has a thickness of greater than or equal to about 0.5 micrometers to less than or equal to about 3 micrometers.

19. The rotor of claim 18, wherein the composite structure of the adhesive coating further comprises a particulate component distributed throughout the matrix component, the particulate component comprising particles of an elastomer.

20. The rotor of claim 18, wherein the cavities exhibit a continuous shape with opposite distal ends adjacent an outer circumference of the rotor body, and wherein the cavities are not segmented by webs defined by the rotor body.

* * * * *